US011932455B2

(12) United States Patent
Christian, Sr.

(10) Patent No.: US 11,932,455 B2
(45) Date of Patent: *Mar. 19, 2024

(54) SYSTEM AND METHOD FOR SELF RELEASING CHAMPAGNE CORK WITH ELECTROMECHANICAL RELEASE MECHANISM

(71) Applicant: Michael B. Christian, Sr., Elon, NC (US)

(72) Inventor: Michael B. Christian, Sr., Elon, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,187

(22) Filed: Oct. 5, 2023

(65) Prior Publication Data

US 2024/0034517 A1 Feb. 1, 2024

Related U.S. Application Data

(63) Continuation of application No. 17/960,472, filed on Oct. 5, 2022, now Pat. No. 11,807,424, which is a (Continued)

(51) Int. Cl.
*B65D 39/12* (2006.01)
*B01F 31/00* (2022.01)
(Continued)

(52) U.S. Cl.
CPC .............. *B65D 39/12* (2013.01); *B01F 31/00* (2022.01); *B01F 31/201* (2022.01); *B65D 1/08* (2013.01);
(Continued)

(58) Field of Classification Search
CPC ...... B65D 39/12; B65D 39/16; B65D 39/007; B65D 39/0017; B65D 39/0058; B65D 39/0064; B65D 2539/003; B65D 81/245; B65D 55/063; B65D 51/1683; B67B 7/06; B67B 7/066; B67B 7/08; B67B 1/00; B67B 1/04; B67B 2007/0458
USPC ....... 220/232, 720, 800–801, 212, 578, 787, 220/789, DIG. 19; 215/364, 269, 355, 215/228, 231, 296, 358; 222/544–574,
(Continued)

(56) References Cited

U.S. PATENT DOCUMENTS 447,974 A 3/1891 Rheinstrom
759,496 A 5/1904 Baker et al.
(Continued)

FOREIGN PATENT DOCUMENTS

FR 2744098 A1 8/1997
FR 2788035 A1 7/2000
(Continued)

*Primary Examiner* — Chun Hoi Cheung
*Assistant Examiner* — Brijesh V. Patel
(74) *Attorney, Agent, or Firm* — Bold IP, PLLC; Christopher Mayle

(57) ABSTRACT

A system and method for easily operated self-releasing stopper/cork for bottles of compressed liquids. The corks have a gas bladder that is designed to be inserted in a bottle and inflated, the bladder having a ribbed or smooth exterior to complete the sealing of the bottle whereby a gas release mechanism can be activated by depressing a button on a cap or via an on-board micro controller and/or electro-mechanical release solution in the cap. Once the gas is released from the top of the bladder the pressure inside the vessel will collapse the bladder's bottom and eject the cork assembly from the bottle.

4 Claims, 9 Drawing Sheets

Related U.S. Application Data continuation of application No. 17/405,986, filed on Aug. 18, 2021, now Pat. No. 11,498,724.

(51) Int. Cl.

| | |
|---|---|
| ***B01F 31/20*** | (2022.01) |
| ***B65D 1/08*** | (2006.01) |
| ***B65D 39/00*** | (2006.01) |
| ***B65D 77/40*** | (2006.01) |
| ***B67B 1/04*** | (2006.01) |
| ***B67B 7/06*** | (2006.01) |
| ***B67D 3/00*** | (2006.01) |
| ***G08C 17/02*** | (2006.01) |

(52) U.S. Cl.

CPC ......... *B65D 39/0064* (2013.01); *B65D 77/40* (2013.01); *B67B 1/04* (2013.01); *B67B 7/066* (2013.01); *B67D 3/00* (2013.01); *B67D 3/0061* (2013.01); *G08C 17/02* (2013.01); *G08C 2201/30* (2013.01)

(58) Field of Classification Search

USPC ................. 222/399; 81/3.2, 3.48–3.49, 3.08, 81/3.36–3.37, 3.29; 141/329

See application file for complete search history.

(56) References Cited

U.S. PATENT DOCUMENTS

| | | | |
|---|---|---|---|
| 773,345 | A | 10/1904 | Scheidt |
| 908,822 | A | 1/1909 | Turner |
| 978,712 | A | 12/1910 | Drenk |
| 1,416,278 | A | 5/1922 | Furman |
| 1,923,091 | A | 8/1933 | Hoffman |
| 2,115,035 | A | 4/1938 | Morgan |
| 2,196,785 | A | 4/1940 | Takiguchi |
| 2,786,594 | A | 3/1957 | Rigolot |
| 2,921,708 | A | 1/1960 | Marcel |
| 2,940,627 | A | 6/1960 | Schultz |
| 3,128,896 | A | 4/1964 | Schnier |
| 3,135,410 | A | 6/1964 | Federighi |
| 3,180,515 | A | 4/1965 | Lindgren |
| 3,235,117 | A | 2/1966 | Mason, Jr. |
| 3,343,701 | A | 9/1967 | Mahoney |
| 3,557,986 | A | 1/1971 | Poole, Jr. |
| 3,836,035 | A | 9/1974 | Simbirdi |
| 3,900,124 | A | 8/1975 | Marcel |
| 3,994,409 | A | 11/1976 | Nightengale, Jr. |
| 4,076,142 | A | 2/1978 | Naz |
| 4,091,136 | A | 5/1978 | O'Brien et al. |
| 4,098,422 | A | 7/1978 | Slomski |
| 4,363,416 | A | 12/1982 | Loughmiller |
| 4,364,486 | A | 12/1982 | Korte et al. |
| 4,392,578 | A | 7/1983 | Fipp et al. |
| 4,394,921 | A | 7/1983 | Miskinis |
| 4,401,226 | A | 8/1983 | Brown |
| 4,473,174 | A | 9/1984 | Heuser |
| 4,474,302 | A | 10/1984 | Goldberg et al. |
| 4,480,424 | A | 11/1984 | Seldon |
| 4,482,072 | A | 11/1984 | Hankins |
| 4,621,743 | A | 11/1986 | DiRegolo et al. |
| 4,867,209 | A | 9/1989 | Santoiemmo |
| 4,889,251 | A | 12/1989 | Hojnoski |
| 4,978,538 | A | 12/1990 | Gladstone |
| 5,020,395 | A | 6/1991 | Mackey |
| 5,405,033 | A | 4/1995 | Sweed |
| 5,535,900 | A | 7/1996 | Huang |
| 5,651,940 | A | 7/1997 | Buonaiuto et al. |
| 5,722,548 | A | 3/1998 | Hojnoski |
| 5,779,085 | A | 7/1998 | Havlinek et al. |
| 6,168,036 | B1 | 1/2001 | Teng |
| 6,260,474 | B1 | 7/2001 | Yahav |
| 6,305,258 | B1 | 10/2001 | Henderson |
| 6,402,582 | B1 | 6/2002 | Sherer |
| 6,499,618 | B1 | 12/2002 | Leclerc et al. |
| 6,622,595 | B1 | 9/2003 | Federighi |
| 7,051,901 | B2 | 5/2006 | Hickert |
| 7,234,375 | B1 | 6/2007 | Wang Wu |
| 7,395,942 | B2 | 7/2008 | Michalopoulos |
| 7,726,356 | B2 | 6/2010 | van der Lande |
| D639,657 | S | 6/2011 | Hoyt et al. |
| 8,020,833 | B2 | 9/2011 | Sun et al. |
| 8,573,422 | B1 | 11/2013 | Dillon |
| 8,662,342 | B1 | 3/2014 | DeTolla |
| 8,701,910 | B1 | 4/2014 | Michalopoulos |
| 8,714,383 | B2 | 5/2014 | Corson |
| 8,783,486 | B1 | 7/2014 | Hoyt et al. |
| 8,820,551 | B2 | 9/2014 | Arney |
| 8,910,818 | B2 | 12/2014 | Heiml |
| 9,254,444 | B1 | 2/2016 | Toomey |
| 9,452,875 | B2 | 9/2016 | Jepson |
| 9,597,088 | B2 | 3/2017 | Ottma |
| 9,637,367 | B1 | 5/2017 | Arnold |
| 10,000,320 | B2 | 6/2018 | Gagne |
| 10,526,116 | B1 | 1/2020 | Dorra |
| 2006/0124661 | A1 | 6/2006 | Siimes |
| 2011/0030810 | A1 | 2/2011 | Shellcot et al. |
| 2014/0246396 | A1 | 9/2014 | Jepson |
| 2015/0321894 | A1 | 11/2015 | Rasmussen et al. |
| 2016/0377203 | A1 | 12/2016 | Norman et al. |
| 2017/0129664 | A1 | 5/2017 | Hatamian et al. |
| 2017/0129758 | A1 | 5/2017 | Hume |
| 2017/0275057 | A1 | 9/2017 | Valencia et al. |
| 2017/0283124 | A1 | 10/2017 | Willson |
| 2018/0029861 | A1 | 2/2018 | Tomesch et al. |
| 2018/0037363 | A1 | 2/2018 | Frishman |

FOREIGN PATENT DOCUMENTS

| | | | |
|---|---|---|---|
| FR | 2903671 | A1 | 1/2008 |
| WO | 0013984 | A1 | 3/2000 |
| WO | 2015101818 | A1 | 7/2015 |

SYSTEM AND METHOD FOR SELF RELEASING CHAMPAGNE CORK WITH ELECTROMECHANICAL RELEASE MECHANISM

CROSS REFERENCE TO RELATED APPLICATIONS

This application is a continuation of U.S. patent application Ser. No. 17/960,472, filed on Oct. 5, 2022, which is a continuation of U.S. patent application Ser. No. 17/405,986, filed on Aug. 18, 2021, and issued as U.S. Pat. No. 11,498, 724 on Nov. 15, 2022, which are incorporated herein in their entirety.

FIELD OF DISCLOSURE

The overall invention relates generally to a bottle stopper, and more particularly to a self-releasing stopper for a bottle of pressurized liquid containing sparkling beverage or champagne.

BACKGROUND

The consumption of sparkling beverages, prosecco, and champagne are usually performed during celebrations. These celebrations are timed to a specific moment due to the challenges with releasing the cork or stopper. The cork may or may not release when desired. Additionally, the stopper may eject at velocities over 100 mph. The high velocity and untimed release can lead to the tragedy of a lost opportunity or injury to a participant of the celebration. The present shape of champagne corks makes removal of the cork challenging for timed and safe extraction. In addition, the dart-like shape can act as a projectile that will fly at a continuous high velocity when released. This firm bell shape of the cork maintains full gas pressure on the bottom of the cork throughout the removal process there by instilling maximum force velocity.

SUMMARY

The present invention recognizes the unsolved need for an improved pressurized sealing stopper for the use in bottling applications to time the release of a bottle stopper for bottles containing champagne, wine, and sparkling beverages for celebrations. The stopper has an easy-to-use built-in release mechanism for pressurized bottles of liquids that will reduce the velocity potential of travel when the cork is fully released. The stopper allows for the reduction of the pressure of the bottle prior to full release of the stopper from the bottle neck in pressurized liquid applications allowing the operator to remotely open the bottle from a safe distance.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
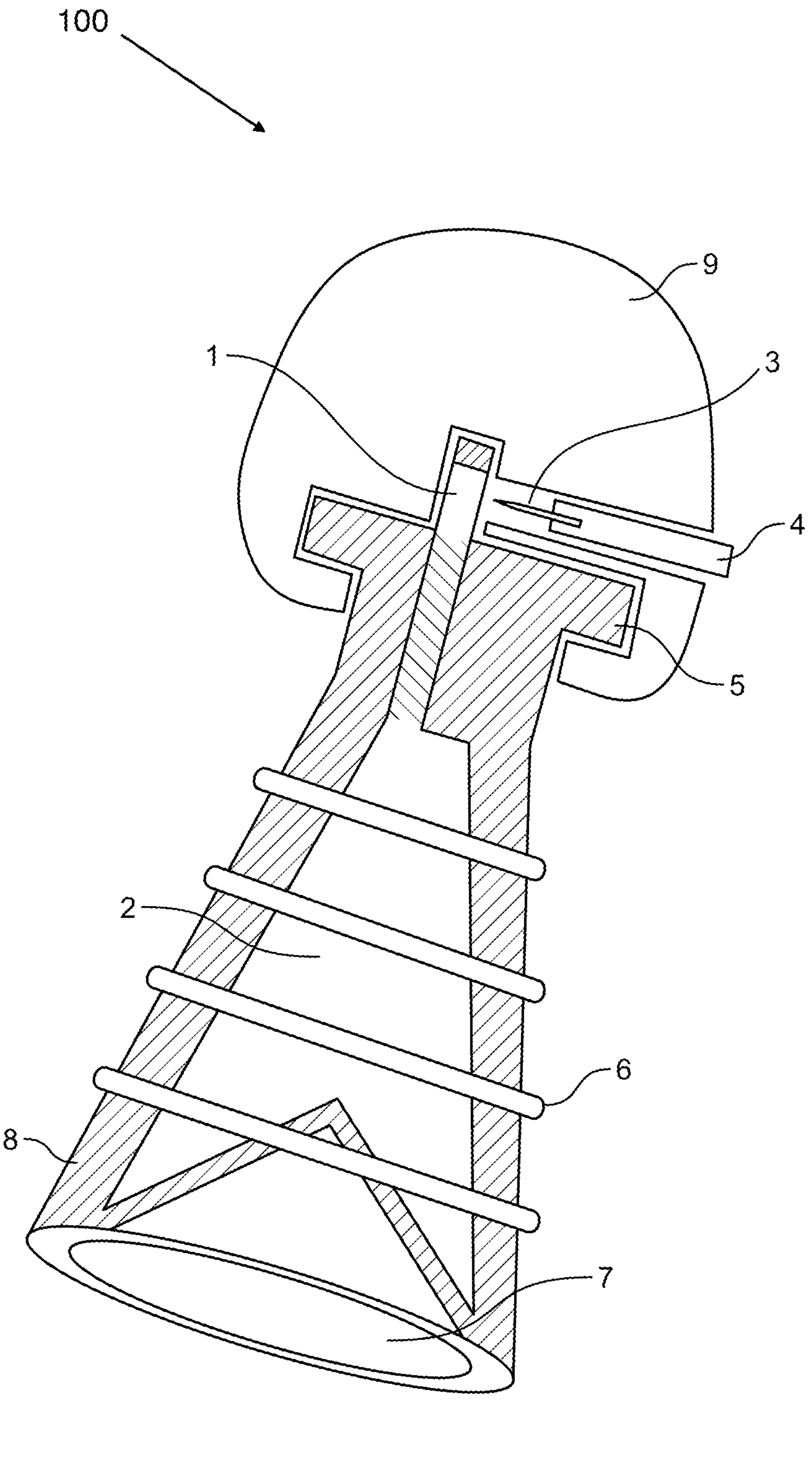
FIG. 1 is a cross sectional view of the self-releasing cork invention.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

FIG. 1 is a sectional view of an embodiment of stopper 100 in accordance with the present invention. Stopper 100 has a molded flexible plug-type inflatable bladder 8. Bladder 8 may be continuous and without seams. Bladder 8 may be hollow with an interior chamber 2. The exterior of bladder 8 may have a surface with raised portions such as a plurality of dots, ribs, or protrusions 6.

Figure 4:
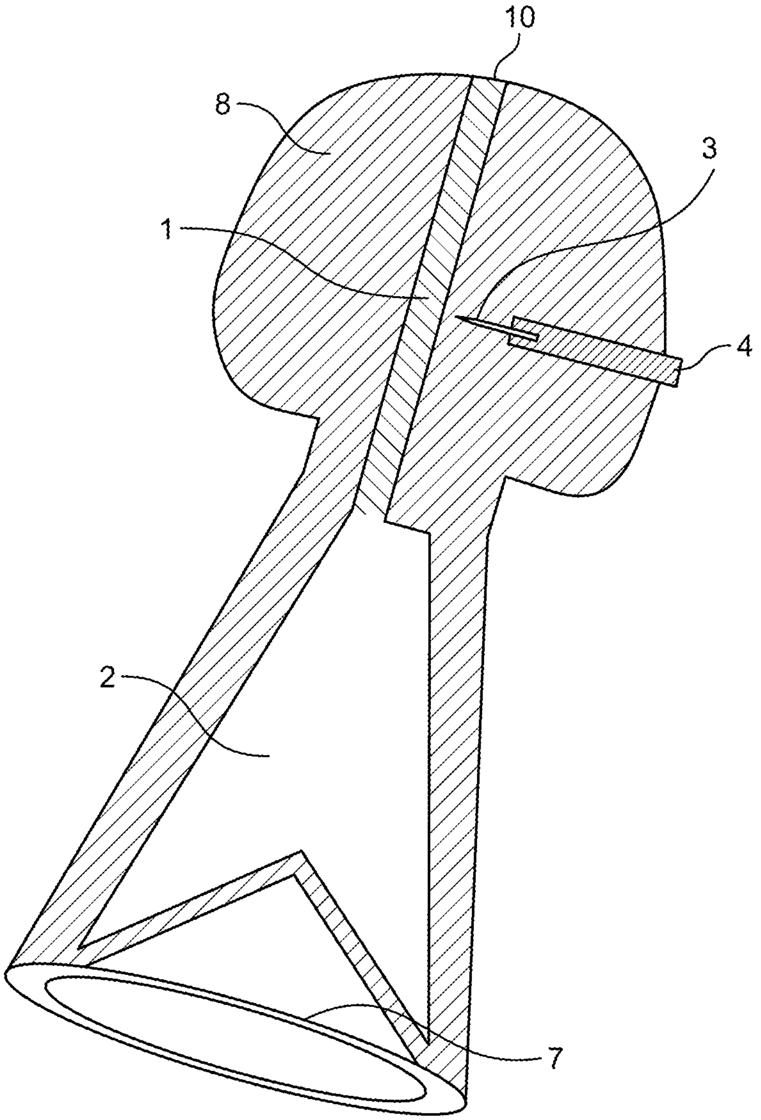
FIG. 4 is a cross sectional view of another embodiment of the self-releasing cork invention.
Figure 5:
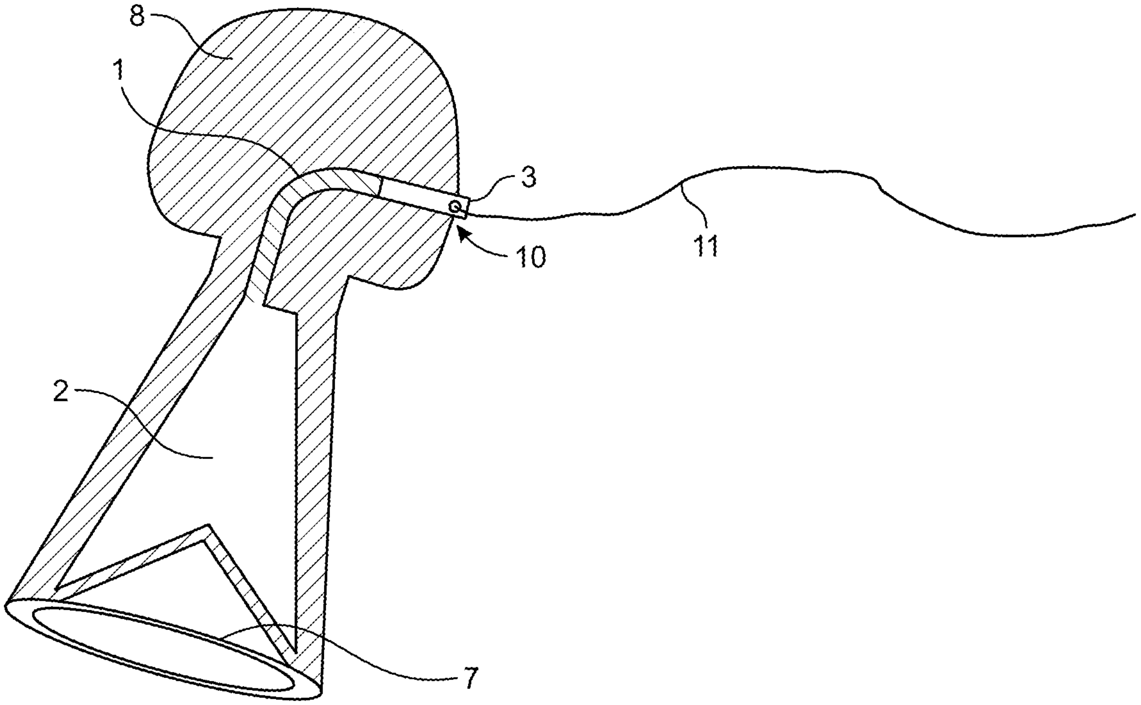
FIG. 5 is a cross sectional view of another embodiment of the self-releasing cork invention.

Bladder 8 may have a V shape or conical bottom portion 7 with multiple angled portions pointing upward and inward to a central point. Conical bottom portion 7 may extend upward from the outer ends of the angled portions into a sidewall. The sidewall has an upward sloping angle that decreases in area until it reaches a circular top portion 5 that is of greater area than an upper top portion of the sidewall but is of less area than conical bottom portion 7. Bladder 8 may be inflated by an inflation tube 1 or filling valve, or plug 10 (as illustrated in FIGS. 4 and 5) that extends through a top outer surface of circular top portion 5 downward into interior chamber 2 such that air or gas may flow through inflation tube 1 into interior chamber 2 from an outside source. In one or more non-limiting embodiments, air or gas may enter manually into interior chamber 2 while an external injection system such as a pump or other device may be used to insert air or another fluid into interior chamber 2. The hole in inflation tube 1 may then be sealed with a plug or release device. In embodiments where inflation tube 1 is a valve, gas may pass through the air inlet into interior chamber 2 while being prevented from leaving interior chamber 2.

A cap assembly 9 may be affixed or otherwise positioned to the top of bladder 8. Cap assembly 9 may have a gas release mechanism for use in stopper 100. The gas release mechanism may utilize a cutting blade or puncturing needle 3 to vent bladder 8. Puncturing needle 3 may be moved towards bladder 8 by a manual or automatic release actuator 4. Actuator 4 may be a button extruding from cap assembly 9 whereby when actuator 4 is moved from a first position to a second position that is closer towards cap assembly 9, puncturing needle 3 also moves in unison in the same direction closer to inflation tube. In further non limiting embodiments, actuator 4 may be a pull string, chain, or rope 11, that extrudes from cap assembly 9, as illustrated in FIG. 5. In this embodiment, actuator 4 may be connected to plug 10, valve, or puncturing needle 3 by a push pull linkage such that when actuator 4 is pulled away from cap assembly 9, plug 10 is removed, or valve is opened or puncturing needle 3 moves closer to inflation tube 1 releasing the gas from interior chamber 2 of bladder 8.

Figure 2:
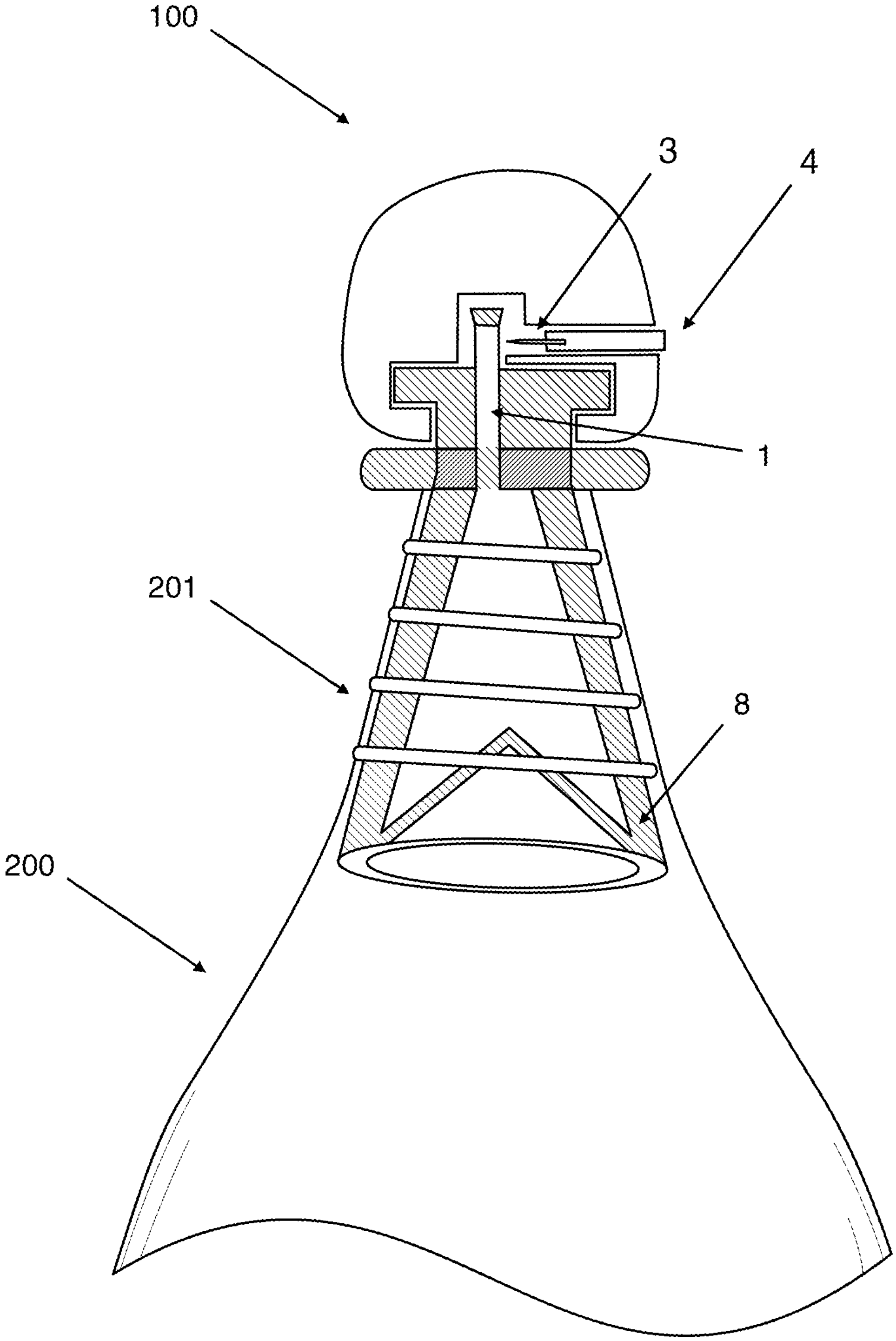
FIG. 2 is a cross-sectional view of the invention inserted in a bottle.

In use, as illustrated in FIG. 2, bladder 8 may be inserted into a neck 201 of a bottle 200 whereby bladder 8 is then inflated and sealed by way of the inflation tube 1. The pressure inside of the bladder 8 will retain stopper 100 until the gas is released through the inflation tube 1. Activation of the release mechanism by actuator 4 will puncture the inflation tube 1 with puncturing needle 3 thereby releasing the gas from interior chamber 2 of bladder 8. The now deflated bladder 8 will be compressed out of the neck by pressure placed on the conical bottom 7 of bladder 8.

Figure 3:
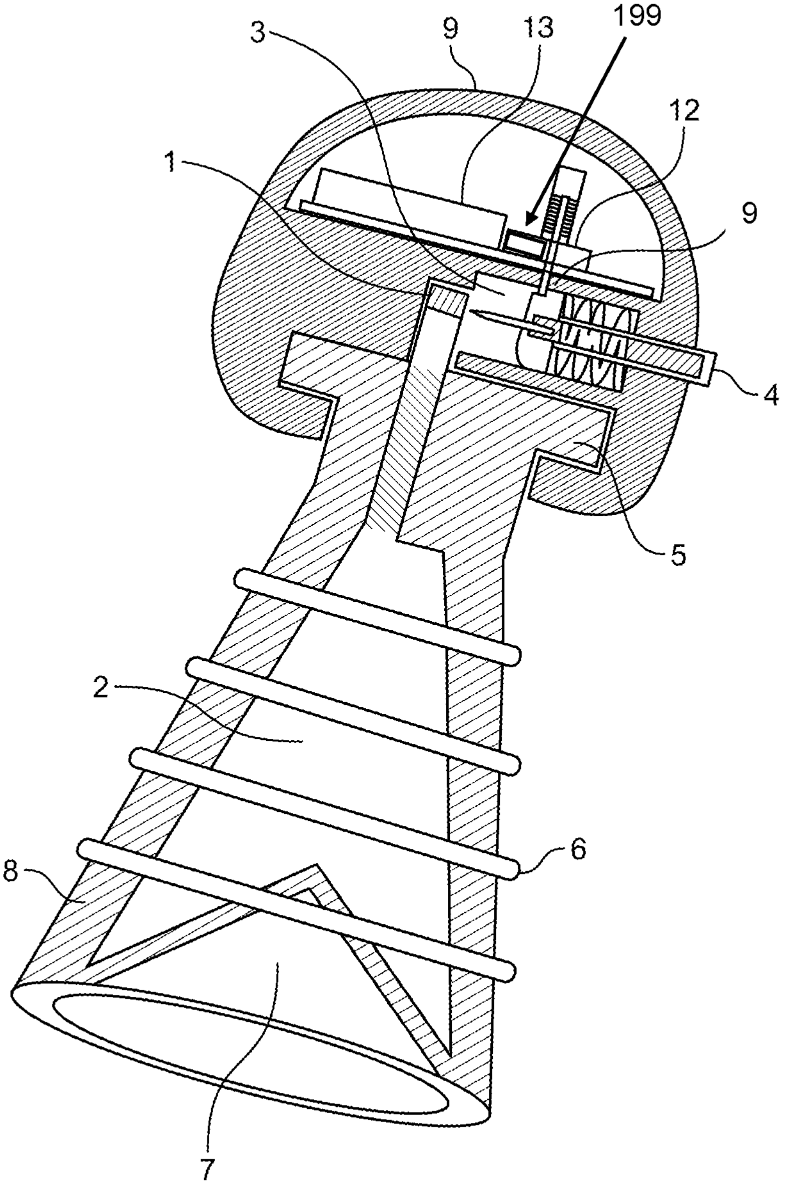
FIG. 3 is a cross-sectional view of the electronically operated variation of the invention.

In further embodiments, cap assembly 9 may have an automatic electromechanical release mechanism 12 used to move puncturing needle 3 towards inflation tube 1 as powered by battery 13, as illustrated in FIG. 3. Electromechanical release mechanism 12 may utilize a control system 199 for remote activation of the release mechanism.

The control system 199 may operate to control the actuation of the other systems including puncturing needle 3. The control system 199 may have a series of computing devices. The control system 199 may be in the form of a circuit board, a memory, or other non-transient storage medium in which computer-readable coded instructions are stored and one or more processors configured to execute the instructions stored in the memory. The control system 199 may have a wireless transmitter, a wireless receiver, and a related computer process executing on the processors.

Computing devices of the control system 199 may be any type of computing device that typically operates under the control of one or more operating systems which control scheduling of tasks and access to system resources. Computing devices may be any computing device capable of executing instructions with sufficient processor power and memory capacity to perform operations of the control system 199.

The one or more computing devices may be integrated into the control system 199, while in other non-limiting embodiments, the control system 199 may be a remotely located computing device or server configured to communicate with one or more other control system 199*s*. The control system 199 may also include an internet connection, network connection, and/or other wired or wireless means of communication (e.g., LAN, etc.) to interact with other components. The connection allows a user to update, control, send/retrieve information, monitor, or otherwise interact passively or actively with the control system 199.

The control system 199 may include control circuitry and one or more microprocessors or controllers acting as a servo control mechanism capable of receiving input from sensors and other components, analyzing the input from sensors and other components, and generating an output signal to components. The microprocessors (not shown) may have on-board memory to control the power that is applied to the various systems. The control system 199 may be preprogrammed with any reference values by any combination of hardwiring, software, or firmware to implement various operational modes including but not limited to temperature, light, and humidity values.

The microprocessors in the control system 199 may also monitor the current state of circuitry within the control system 199 to determine the specific mode of operation chosen by the user. Further, such microprocessors that may be part of the control system 199 may receive signals from any of or all systems. Such systems may be notified whether any of the components in the various systems need to be replaced.

Electromechanical release mechanism 12 may include a wireless communication interface, which may be a digital, analog, or mixed-signal circuit to transmit wireless signals indicating user input received from electromechanical release mechanism 12. The wireless signals may be transmitted to a computing device 220 such as a phone, a computer, a wearable device, tablet, a virtual reality system, etc. The wireless communication interface may send and receive data via a wireless network without the need for connecting cables to stopper 100.

Figure 6:
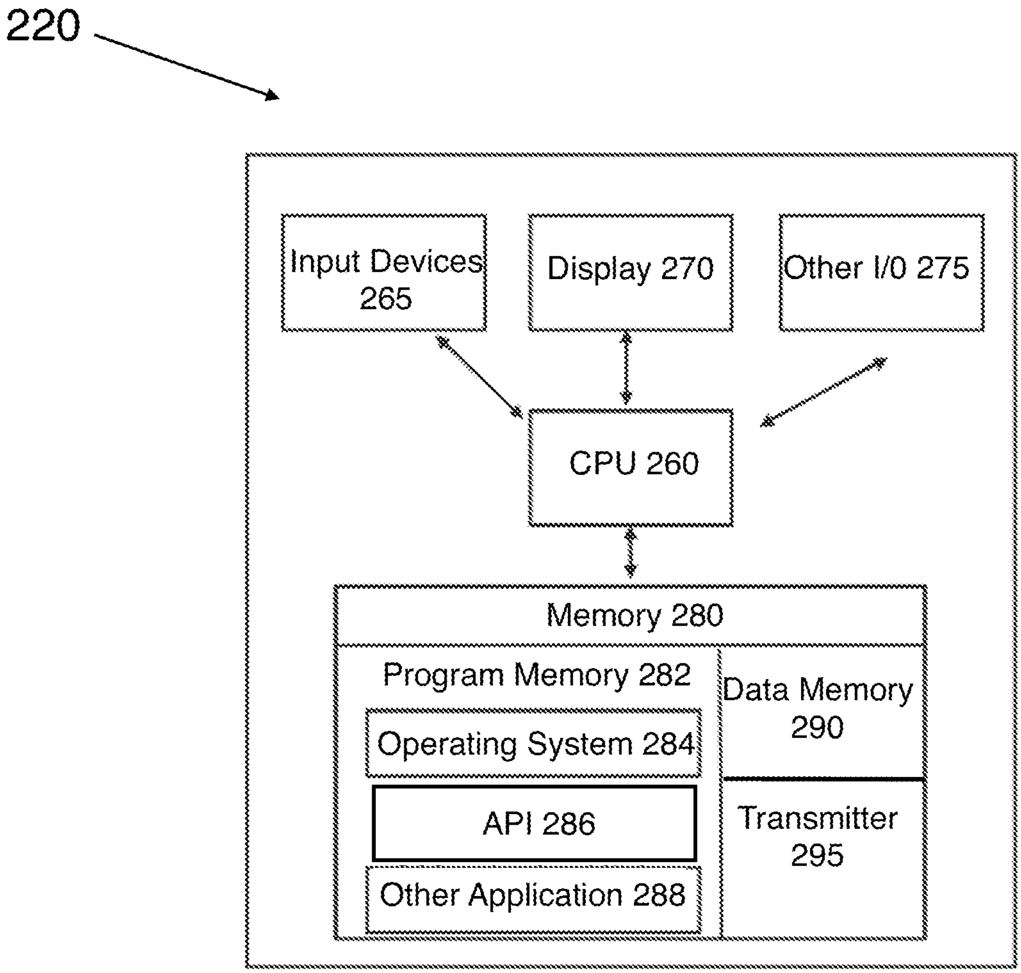
FIG. 6 is a block diagram of the remote computing device.

Turning to FIG. 6, FIG. 6 is a block diagram showing various components of computing device 220. Computing device 220 may comprise a housing for containing one or more hardware components that allow access to edit and query electromechanical release mechanism 12. Computing device 220 may include one or more input devices such as input devices 265 that provide input to a CPU (processor) such as CPU 260 of actions related to user 202. Input devices 265 may be implemented as a keyboard, a touchscreen, a mouse, via voice activation, wearable input device, a 3D camera, a trackball, a microphone, a fingerprint reader, an infrared port, a controller, a remote control, a fax machine, and combinations thereof.

Actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen or an LED.

Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display 270 may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application and application programing interface (API), such as application 286, and other computerized programs or application programs such as application programs 288. Memory 280 may also include data memory such as data memory 290 that may include database query results, configuration data, settings, user options, user preferences, or other types of data, which may be provided to program memory 282 or any element of user computing device 220.

Computing device 220 may have a transmitter, such as transmitter 295. Transmitter 295 may have a wired or wireless connection and may comprise a multi-band cellular transmitter to connect to the server over 2G/3G/4G/5G cellular networks. Other embodiments may also utilize Near Field Communication (NFC), Bluetooth, or another method to communicate information.

Figure 7:
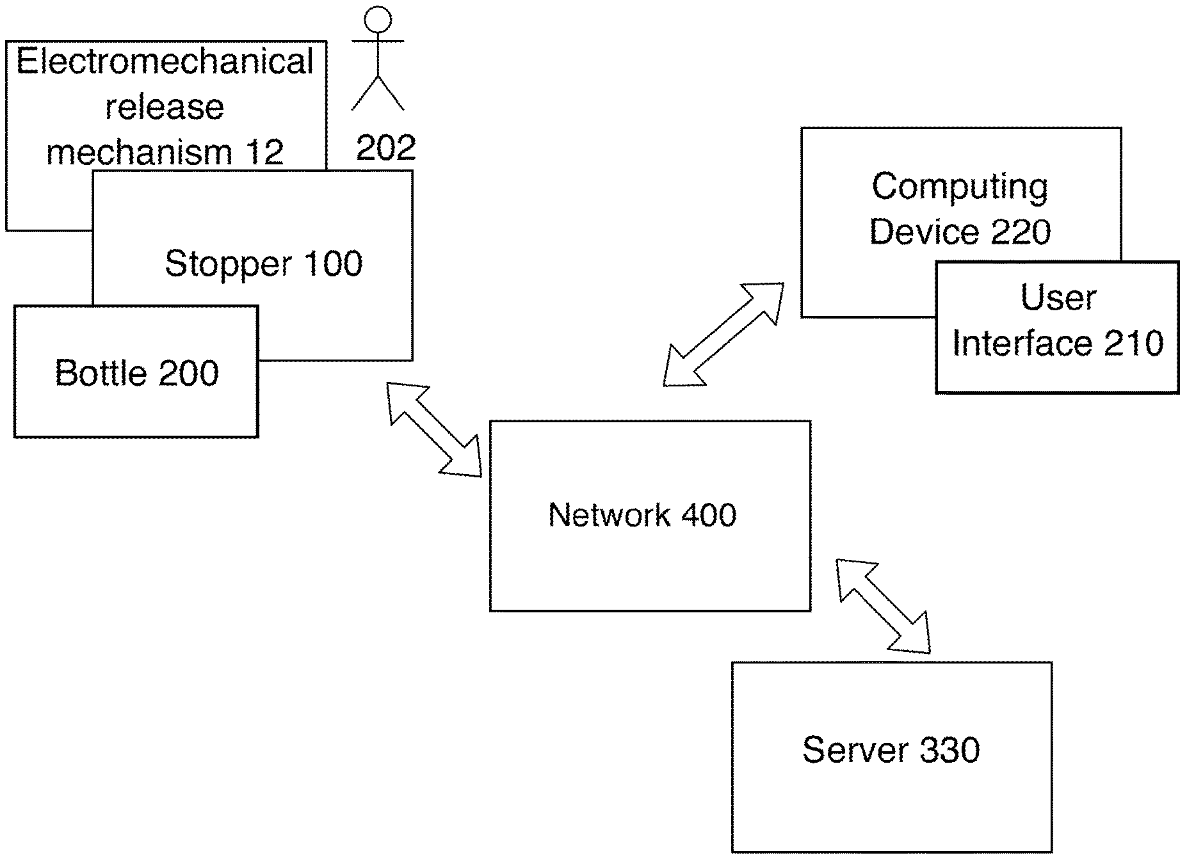
FIG. 7 is a block diagram of a connected network for the self-releasing cork.

As illustrated in FIG. 7, a user 202 may access a user interface, such as user interface 210 using computing device 220. User interface 210 may have a plurality of buttons or icons that are selectable to perform particular processes in response to the selections. User interface 210 may have conventional GUI interface devices such as a title bar, toolbars, pull-down menus, tabs, scroll bars, context help, dialog boxes, operating buttons (icons) and status bar the user 202 navigates throughout the display.

In some embodiments, stopper 100 and computing device 220 may be in communication with one or more servers, such as server 330 or one or more networks such as network 400. Server 330 may be located at a data center, or any other location suitable for providing service to network 400 whereby server 330 may be in one central location or in many different locations in multiple arrangements. Server 330 may comprise a database server such as MySQL® or Maria DB® server. Server 330 may have an attached data storage system storing software applications and data. Server 330 may have a number of modules that provide various functions related to stopper 100. Modules may be in the form of software or computer programs that interact with the operating system of server 330 whereby data collected in databases as instruction-based expressions of components and/or processes may be processed by one or more processors within server 330 or as well as in conjunction with execution of one or more other computer programs. Modules may be configured to receive commands or requests from interactive stopper 100, computing device 220, server 330, and outside connected devices over network 400. Server 330 may comprise components, subsystems, and modules to support one or more management services for stopper 100.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including a telecommunications network, a wireless network (including Wi-Fi), and a wireline network. Network 400 may include mobile telephone networks utilizing any protocol or protocols used to communicate among mobile digital user computing devices (e.g., computing device 220), such as GSM, GPRS, UMTS, AMPS, TDMA, or CDMA. In one or more non-limiting embodiments, different types of data may be transmitted via network 400 via different protocols. In alternative embodiments, computing devices 220 may act as standalone devices or they may operate as peer machines in a peer-to-peer (or distributed) network environment.

4 Network 400 may further include a system of terminals, gateways, and routers. Network 400 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between user computing devices if, for instance, they are in a remote location not accessible by other networks.

User interface 210 on computing device 220 may display statuses for stoppers 100 that are registered or otherwise in communication with computing device 220. For instance, user interface 210 may display information to user 202 logged in to an account that includes three stoppers 100 for three different types of drinks. A status for each stopper 100 is displayed on a list. In one embodiment, the list may be a dynamic list in which the stoppers 100 are ordered according to the name of the drink.

User interface 210 may have an adjustable timer component for stopper 100 to operate in synchronization whereby the timer component may enable input from user 202 for electromechanical release mechanism 12 to delay state changes when puncturing inflation tube 1. Thus, activation may be delayed for an amount of time by user 202 through user interface 210. The amount of time for the delay may be predetermined, at random, or by the input obtained from user 202 such as based on the amount of time user 202 selects a selectable manual button on user interface 210 to open the bottles. User interface 210 may allow user 202 to open bottles only at certain times of the day. For instance, user interface 210 may present to user 202 options to switch the state of electromechanical release mechanism 12 to operate at preprogrammed times, at times determined according to a random pattern, or any other variation. User interface 210 may present one or more clocks that provide an understanding of time of day, day, month, or year, that bottles may open.

Figure 8:
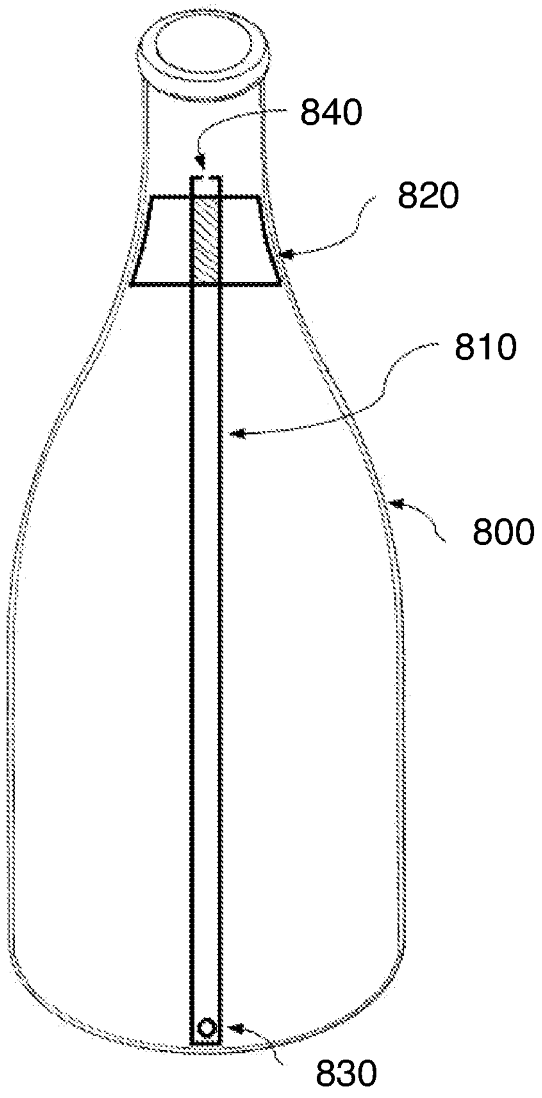
FIG. 8 is an embodiment having a tube in a bottle.

In one or more non-limiting embodiments a second embodiment of the invention may be used. During celebrations using champagne, sparkling wine, prosecco, or sparkling beverage it is customary to spray the beverage from the bottle to increase the joy of celebration. This embodiment intends to provide a means to spray the fluid without participant intervention instead of deflating the bladder as illustrated in FIG. 8. It is also the intention of this embodiment to compliment stopper 100 in that it will vent the fluid upon release of the cork. This embodiment consists of a tube or pipe 810 inserted into a bottle 800. Bottle may be filled with champagne, sparkling wine, prosecco, or sparkling beverage. A sealing component 820 may be positioned around tube 810 at the upper portion of bottle 800 between the upper and lower internal surfaces of the bottle whereby sealing component 820 has a trapezoidal shape. Tube 810 extends through sealing component 820. Tube 810 may have one or more bottom protrusions or slits the bottom section contains holes, slits or gaps 830 that allow fluid from bottle 800 to vent into tube 810 and out thru the top of bottle 800. This configuration allow tube 810 to vent the fluid while preserving the internal gases in bottle 800. In some embodiments an upper portion of tube 810 above sealing component 820 may have a nozzle or restrictive hole 840 that cause the liquid to spray during ventilation.

Figure 9:
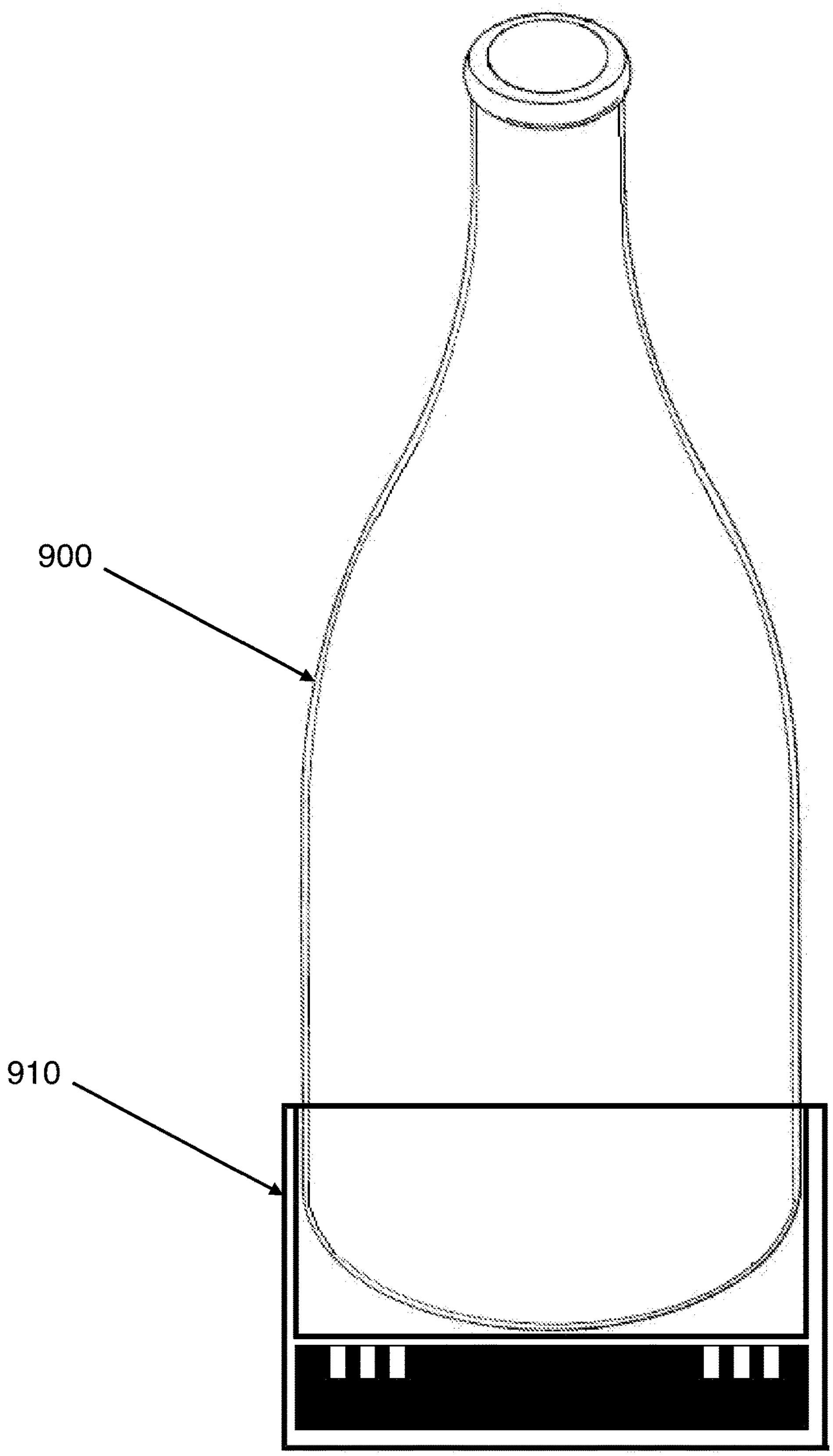
FIG. 9 is an embodiment of an actuator for the bottle.

In yet another embodiment an agitator 910 may be used to cause gas release from the pressurized liquid to propel a cork or stopper 100 from bottle 900 as illustrated in FIG. 9 whereby the agitator 910 is secured around bottle 900 by a friction fit or any number of fasteners. It is the intention of agitator 910 to agitate the beverage by means of an external device. Agitator 910 may have one or more vibrating motors or may agitate the internal fluid by means of vibration, sound, or other frequencies designed to propel the cork from bottle 900. To achieve maximum gas release agitation of bottle 900 agitator 910 may be positioned at the base of bottle 900 or strapped to a side of bottle 900. Agitator 910 may have similar computing devices or activation methods to stopper 100 whereby agitator 910 may be activated by a push or pull mechanism and may be controlled wirelessly by one or remote devices such as a mobile phone or computer.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A stopper for a neck of a bottle, the stopper comprising:
an inflatable bladder with an interior chamber, wherein an actuator releases pressure of an internal gas stored in the inflatable bladder externally to the stopper and the bottle.

2. The stopper of claim 1, wherein the actuator that moves from a first position to a second position, venting the internal gas to an external environment.

3. The stopper of claim 2, wherein the actuator is connected to a needle, blade, or valve.

4. The stopper of claim 3, wherein the inflatable bladder has one or more ribs or protrusions on an exterior of the inflatable bladder.

* * * * *